United States Patent
Fante et al.

(10) Patent No.: US 7,542,204 B2
(45) Date of Patent: Jun. 2, 2009

(54) PRISM FOR ERGONOMIC POSITION

(76) Inventors: Stephen D. Fante, 2530 N. 8th St., Suite 106, Grand Junction, CO (US) 81501; John M. Holcomb, P.O. Box 35220, Tucson, AZ (US) 85740

(*) Notice: Subject to any disclaimer, the term of this patent is extended or adjusted under 35 U.S.C. 154(b) by 7 days.

(21) Appl. No.: 11/655,669

(22) Filed: Jan. 19, 2007
(Under 37 CFR 1.47)

(65) Prior Publication Data
US 2007/0171520 A1    Jul. 26, 2007

Related U.S. Application Data

(60) Provisional application No. 60/762,381, filed on Jan. 26, 2006.

(51) Int. Cl.
*G02B 27/02* (2006.01)

(52) U.S. Cl. .................................. 359/411; 359/412

(58) Field of Classification Search ................ 351/158, 351/41, 47, 57, 58, 48; 359/480–482, 411, 359/412, 385
See application file for complete search history.

(56) References Cited

U.S. PATENT DOCUMENTS 6,120,145 A * 9/2000 Lyst et al. .................. 351/158

* cited by examiner

*Primary Examiner*—Hung X Dang (57) ABSTRACT

A single view angle deflector or a pair of viewing angle deflectors located proximal to the user's eye[s] and below the user's normal straight-ahead vision, with the eyepiece tilted at 22.5° or less relative to the horizontal and the deflector providing a deflection of light rays of preferably 37.5°.

4 Claims, 10 Drawing Sheets

PRISM FOR ERGONOMIC POSITION

CROSS REFERENCE TO RELATED APPLICATIONS

This Application claims priority to Provisional Application U.S. Ser. No. 60/762,381 filed Jan. 26, 2006

FIELD OF THE INVENTION

This invention relates to viewing angle deflectors which allow a user to maintain a desirable posture without neck, back, or eye stress while operating on a patient or device that requires use of the hands below the normal level of eyesight. More particularly, a prism located proximal to the user's eye is employed with or without magnifying optics to deflect light from the operating area into the user's comfortable field of vision, enabling the user to maintain upright posture throughout a procedure.

BACKGROUND OF THE INVENTION

Dentists, surgeons and other professionals use various surgical telescopes or magnification loupes to create a magnified image of the visual field. Most, but not all, of these devices are on-axis units, meaning that the eyepiece and objective share the same axis. To accommodate for this straight-axis vision, the user must assume an unfavorable posture involving a combination of head and back bend and/or excessive eye tilt. These conditions frequently result in back and/or neck pain and eye strain, all of which intensify with prolonged use. Such neck, back and eye problems afflict a high percentage of dentists, surgeons and people in various other occupations where head and eye tilt are essential to view the operating area well below the normal, horizontal view.

The mounting of the majority of magnifying optics provides a fixed downward tilt from the horizontal vision of a surgeon or dentist, standing or sitting in an upright position, and requires eye tilt in use. Most magnifying optics require eye tilt of between 10° and 34°, while some are as extreme as 45°. Eye strain is proportional to eye tilt and prolonged eye tilt greater than 25° can lead to significant eye strain. Eye tilt of 22.5° or less has been found to be acceptable and does not result in undue eye strain for the user.

As noted in U.S. Pat. 5,923,467, granted Pericic et al. on Jul. 13, 1999:

When performing surgery, for example, a surgeon relies on a high level of eye hand co-ordination generally with a small margin for error and so to enhance the precision and accuracy of the surgery it is necessary to magnify the region of the operation. Operating optical microscopes which comprise optical devices mounted on fixed stands have been used by surgeons for this purpose. However the field of view of these microscopes is set at the beginning of an operation and is not easily reset if a surgeon needs to alter the field of view to gain a better perspective of the operation or of the operating region.

It is also common for surgeons to wear small head mounted binoculars or loupes to magnify their field of view. However as the level of an operation is below the normal level of eyesight of the surgeon, the head of the surgeon must be inclined to enable him to watch and co-ordinate his hands. During long operations even a slight inclination of the head can overwork the muscles of the neck discomforting the surgeon and providing an additional unnecessary distraction. This problem is compounded by the weight of the head mounted loupes.

To allow a surgeon to sit and concentrate in one position for a long length of time and reduce the stress on the muscles of the neck it is preferable that the head and neck of the surgeon be in an upright aligned position so that the surgeon's line of sight is straight ahead. However due to the level of an operation this position is not possible with existing loupes.

Furthermore this problem is not exclusively confined to those in the surgical profession. In fact any person such as a jeweller who is using existing loupes and manipulating very small objects for any length of time will encounter the same problems associated with inclination of the head, as the surgeon.

Many experts believe ergonomic factors should be the major selection criteria for devices to be used by dentists and surgeons in performing their work. Most dentists and surgeons with ideal posture and ergonomic position require a viewing angle relative to straight-ahead viewing of between 55° and 75° for the vast majority of procedures. This viewing angle range is desired with or without telescopes, loops or magnifying optics in the viewing path.

B. J. Chang, Ph.D. and President of Surgitel Systems, a division of General Scientific, Corp., is greatly concerned and is interested in preventing chronic neck and back problems for dental care providers. He has authored articles and presented lectures focusing on the importance of correct viewing angles for dentists. The viewing angle determines neck and back posture and Dr. Chang calls it the most important ergonomic factor. "Most telescopes, due to their limited declination angles, are not very ergonomic and may actually cause excessive head tilt and neck pain," Chang warns.

Dr. David Ahearn, president of Design/Ergonomics, states, "Loupes can be part of the problem in terms of neck pain and in terms of overall flexibility of treatment."

Several designs have taken steps to provide a means of placing combinations of mirrors or prisms between the objective and eyepiece to attempt to resolve the problem. Pericic et al. discloses a single Schmidt prism which changes the path of the image by 45° after passing through the objective. This device is utilized with the operator looking straight ahead (horizontally), even though the ability of the user to see over the device with normal, unmagnified vision is essential in practical use. If one tips this device down far enough to see over it, the resultant viewing angle deviation is too great for the majority of applications.

Others have used mirrors and various prisms to redirect the incoming light path, but many are too large to be practical. Devices with mirror/prism attachments located beyond or anterior to the magnifying optics or the telescope unit exist, but these units are heavy to the user. One reason for this is the leverage which exists due to extending the deflector anteriorly. This creates more force on the supporting device of the user. The Lyst et al. (U.S. Pat. No. 6,120,145) is an example of such a design, which employs path deviating prisms and/or reflectors beyond the magnifying optics. Some prism or mirror units are designed to be used without magnification, such as the device disclosed in U.S. Pat. No. 6,280,031 by Zerkle. This device provides a 90° viewing angle change.

None of the prior art devices, including those disclosed in the Pericic et al. and Lyst et al. Patents, have the essential features of an ideal Prism for Ergonomic Position or ideal viewing angle deflector.

SUMMARY OF THE INVENTION

The viewing angle deflector of this invention is light in weight due to the compact design, allows for ideal neck, back and eye position, provides an optimum viewing angle deviation, produces a properly oriented image, and allows the user to see over the device. Another feature of the prism combination of this invention is that it enables the operator to instantly change the field of view. This is not possible with the operating optical microscopes.

Most dentists and surgeons will have an optimal viewing angle below horizontal between 55° and 75° in order to maintain ideal ergonomic position. A Schmidt/Amici (SA) and a double Schmidt/half pentaprism (2SP) combination of this invention provide a viewing angle change of 37.5° by deflection or prism tilt; which when combined with an eyepiece tilt of 22° or 22.5° results in a viewing angle of 59.5° or 60°.

The 2SP prism combination is comprised of three sub-prisms, namely, two atypical Schmidt or non-standard Schmidt prisms and one-half of a penta prism. The non-standard Schmidt prisms have a vertex angle of 41.25° rather than the usual 45° vertex angle of a standard or typical Schmidt prism.

The 2SP prism combination is oriented to provide an entry angle to the Schmidt prism relative to the horizontal of approximately 60°. This angle is preferably 59.5° with an output angle of the prism combination relative to horizontal of 22°. The position of the prisms may be reversed with the one half of a penta prism being the entry prism. The entrance and exit angles to the 2SP prism are 90° or orthogonal to the faces of the entry and exit prisms.

The SA prism combination is comprised of two sub-prisms, namely, a standard 45° Schmidt prism and an Amici Roof prism or Amici type prism. The Amici Roof or Amici type prism is a non-dispersive Anamorphic Amici-type prism. The entrance and exit angles are 90° or orthogonal relative to the entrance and exit faces of the combination. The SA prism combination may be oriented to provide an entry angle of 60° relative to horizontal for either the Amici Roof prism or the standard Schmidt prism. The combination, with a 60° entry angle, has an output angle relative to horizontal of 22.5°.

Depending on individual preference, the operator can optimize his or her posture simply by adjusting the position of the field of view horizontally or vertically by four inches or less with either prism combination.

Figure 6A:
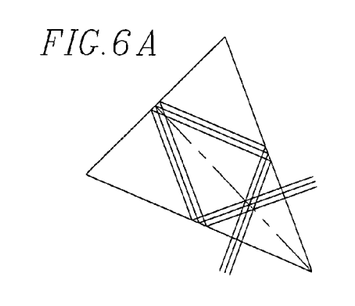
FIGS. 6A-6C are right-side elevation views of a standard Schmidt prism in three different rotational positions.
Figure 6B:
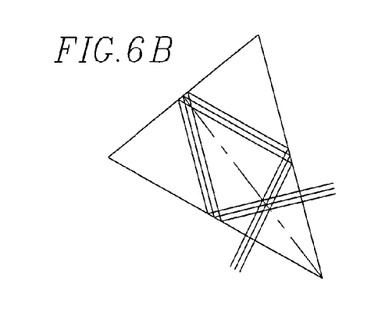
Figure 6C:
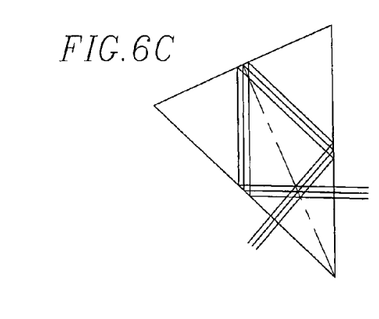
Figures 7A, 7B, 9:
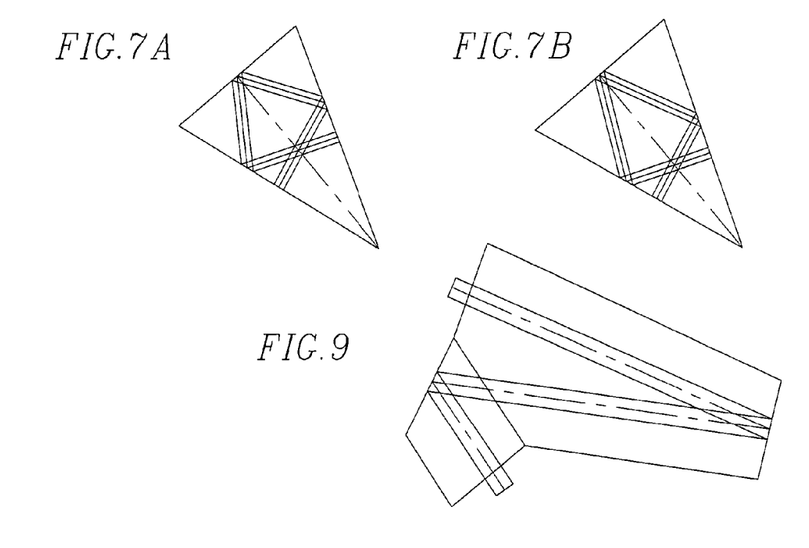
FIGS. 7A-7B are right-side elevation views of non-standard Schmidt prisms in two different rotational positions, in accordance with the present invention.
FIG. 9 is a left-side elevation view of another alternative prism, in accordance with the present invention.
Figure 8A:
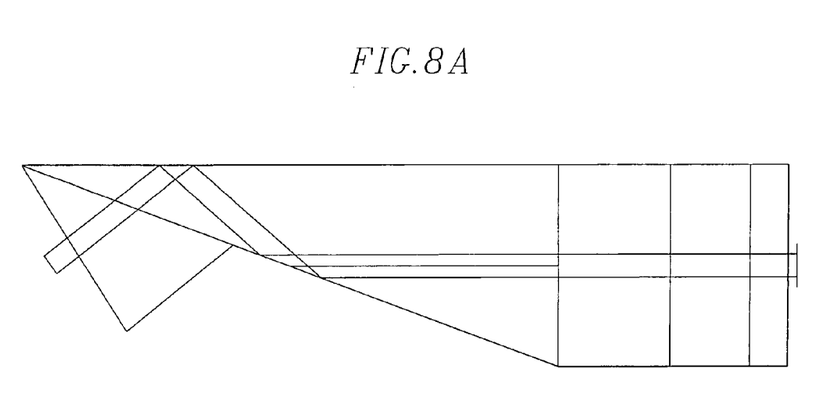
FIG. 8A is a right-side elevation view of an alternative prism, in accordance with the present invention.
Figure 8B:
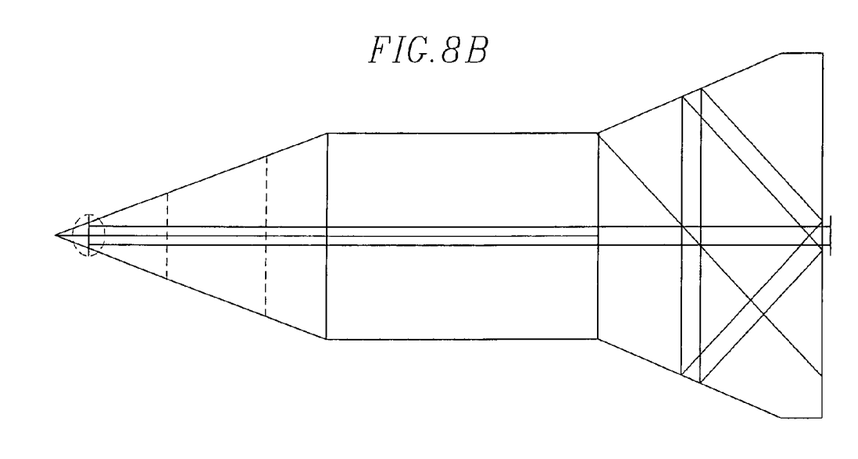
FIG. 8B is a top-plan view of the alternative prism, in accordance with the present invention.
Figure 8C:
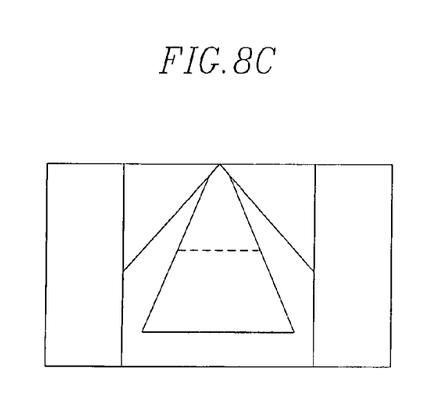
FIG. 8C is a front-end elevation view of the alternative prism, in accordance with the present invention.

Additional prism designs for this invention include a single Schmidt prism with a vertex angle between 37.5° and 44°, the Frankford Arsenal Prisms, a direct vision prism/horizontal Pechan prism combination which includes one roof, and an additional two-prism combination. These alternative designs are shown in FIGS. 6, 7 and 8. None of these prisms offer all the advantages of the SA or the SP designs.

The SA and 2SP prism combinations of this invention, with or without magnifying optics, increases efficiency, prevents neck, back and eye strain and provides long-term career and health benefits. Comfortable eye tilt of 22° to 22.5° and prism tilt of 37.5° are utilized in the SA and 2SP designs, resulting in a total viewing deviation from the horizontal plane of 59.5° or 60°. A viewing angle of 59.5° to 60° is optimum for most users. With either design, surgical telescope operators are able to maintain ergonomic position and avoid the prevalent profession-related musculoskeletal and eye problems, thus vastly improving the quality of their overall practice life.

The above and other features, objects and advantages of this invention will become apparent from a consideration of the foregoing and the following description, the accompanying drawings and the appended claims.

DESCRIPTION OF THE PREFERRED EMBODIMENT

For the patient, a dental visit typically involves sitting in a reclined or even supine position, and the dentist often has to contort his/her body to perform the procedure. During an operation, the patient is usually unconscious and supine on an operating table and the surgeon must compromise his/her body position to complete the necessary surgery.

From a physical effort standpoint, there are many similarities between the work of dentists and surgeons. Both professions typically require prolonged postural compromises over a reclined or supine patient and the use a variety of hand instruments in a delicate manner for extended periods of time. The kinds of posture-related musculoskeletal problems reported by dentists and surgeons also afflict other professions involving long periods of work with poor postural positions.

It is desirable to have a device that will either fasten onto spectacles, is made as part of the spectacles, or is supported by a headband that permits the surgeon or dentist to sit or stand in a position where there is no bending of the neck or back nor severe tilting of the eyes. Such a device permits the surgeon or dentist to see over and around the device with normal vision and to look through the device to observe the operating area. The SA and 2SP Prisms for Ergonomic Position provide these advantages. An additional benefit of the SA prism is that high index glass is not required, resulting in an extremely lightweight prism.

Figure 1:
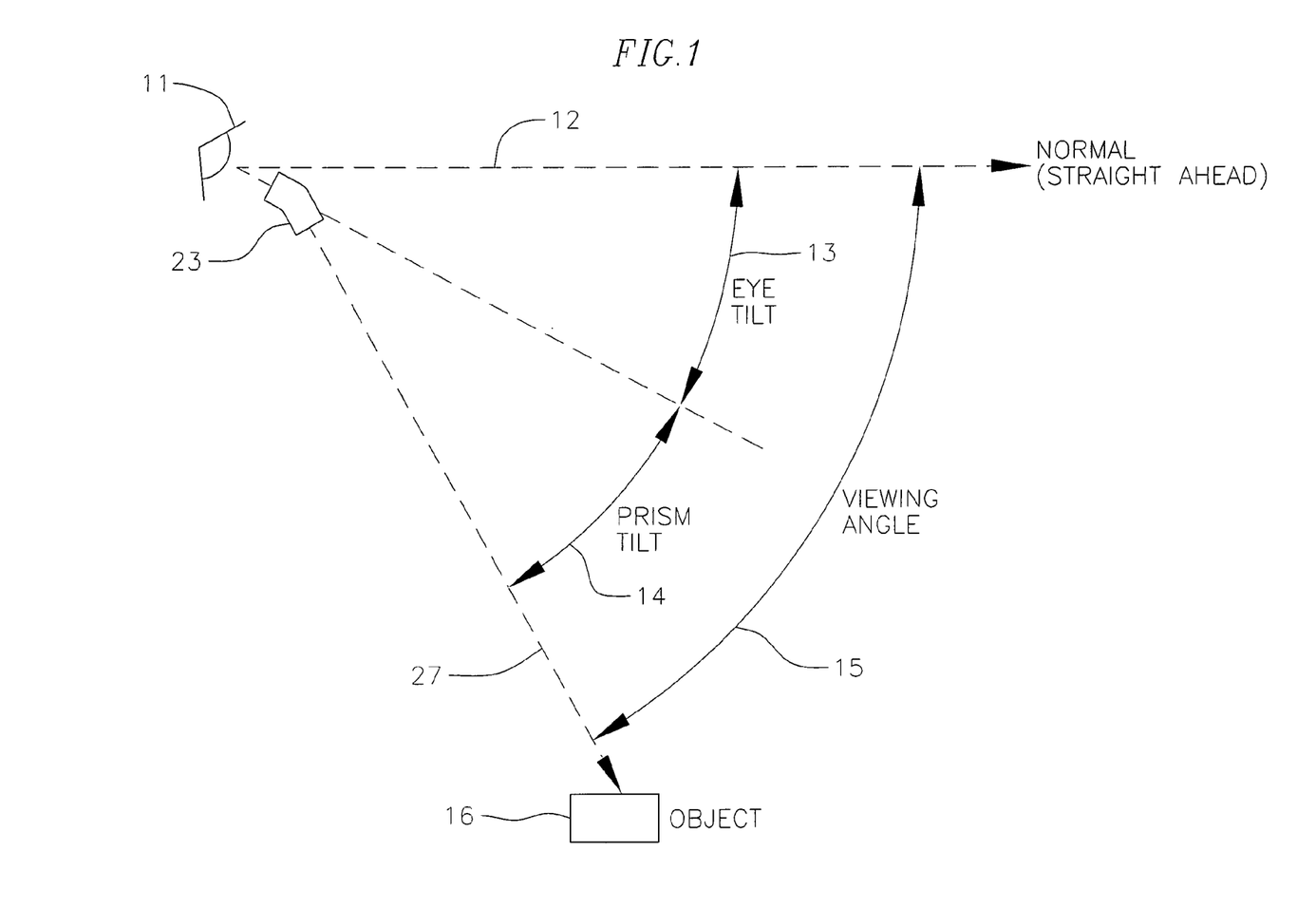
FIG. 1 is a schematic diagram showing the location of the prism for ergonomic position relative to the eye and the resulting eye tilt, prism tilt and viewing angle, in accordance with the present invention.

As noted above, a viewing angle of approximate 60° is ideal for most dentists and surgeons since small adjustments in the total viewing angle can be readily made by changing the position of the field of view (horizontally or vertically) relative to the viewing angle deflectors by four inches or less. A housing 23 for the Prism for Ergonomic Position or viewing angle deflector is shown in FIG. 1 in its position proximal to the eye. The prism is not shown specifically in FIG. 1; however, the 2SP prism within the housing 23 is shown in FIGS. 3A and 3B and outside the housing in FIGS. 2A and 2B. The SA prism combination, shown in FIGS. 10 and 12, has a similar housing, which may have the larger cross-sectional dimension at the eyepiece end when the Amici type prism is at the output end.

The prism in its housing 23 is positioned below the normal or straight-ahead axis 12 (FIG. 1) so that the surgeon or dentist may look over the prism to select instruments, view radiographs, read necessary information, etc. The view through the housing 23 below the horizontal or the straight-ahead axis 12 is achieved by minimal tilting of the eyes rather than tilting the head or bending the back. The eye tilt angle 13 is an ideal 22° or 22.50°, thus avoiding eye strain. The prism in the housing 23 provides additional viewing angle deviation, identified as prism tilt with an angle 14 in FIG. 1. Angle 14 is preferably 37.5° so that the viewing angle, which is the sum of the eye-tilt angle 13 and prism-tilt angle 14, relative to horizontal or the normal or straight-ahead axis 12, is 59.5° or 60°. Thus an object 16 (work area) is visualized along viewing axis 27 by tilting the eyes down 22° or 22.5° without tilting the head or bending the back, resulting in a comfortable and proper ergonomic posture.

Some may find that a viewing angle greater than 60° or less than 59.5° is more comfortable. To accommodate these users, the viewing angle deflector may be mounted for eye tilt other than 22.0° or 22.5°. In general though, the mounting should not require eye tilt of greater than 25°. Further, other prism or prism combinations may be used to provide a degree of prism tilt other than 37.5° for the desired viewing angle.

As shown in FIGS. 3A, 3B, 4A and 4B the housing 23 has an eyepiece end 21, with an ocular lens or aperture 22. At the opposite end of the housing is an objective lens 24.

Figure 2A:
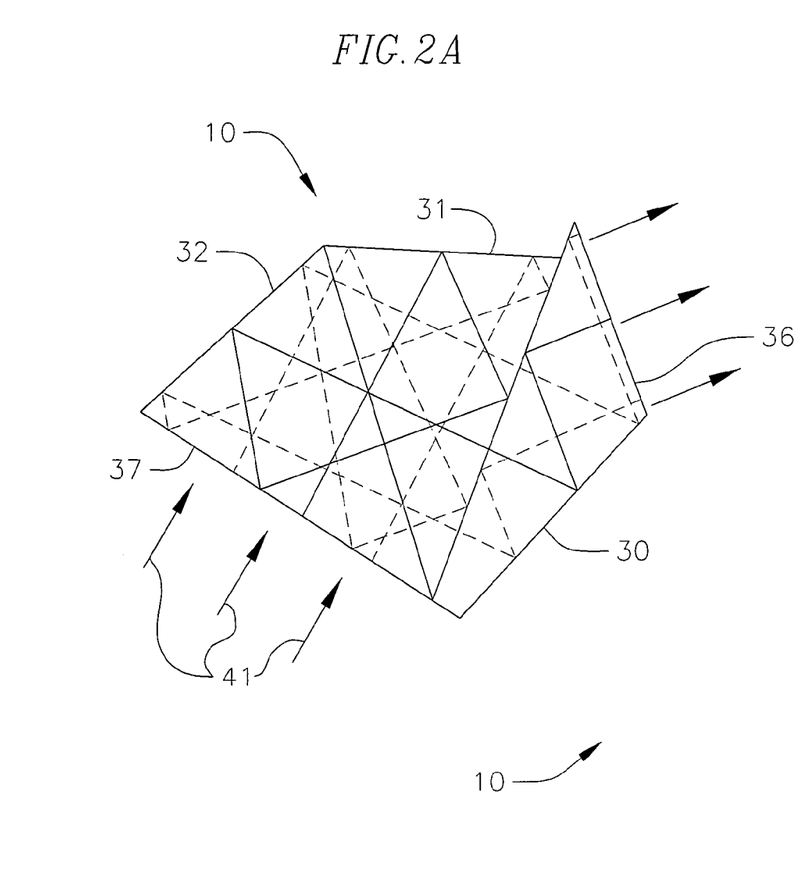
FIG. 2A is a right-side elevation view, including light ray tracings from input to output, of the prism of the 2SP prism combination design, in accordance with the present invention.
Figure 2B:
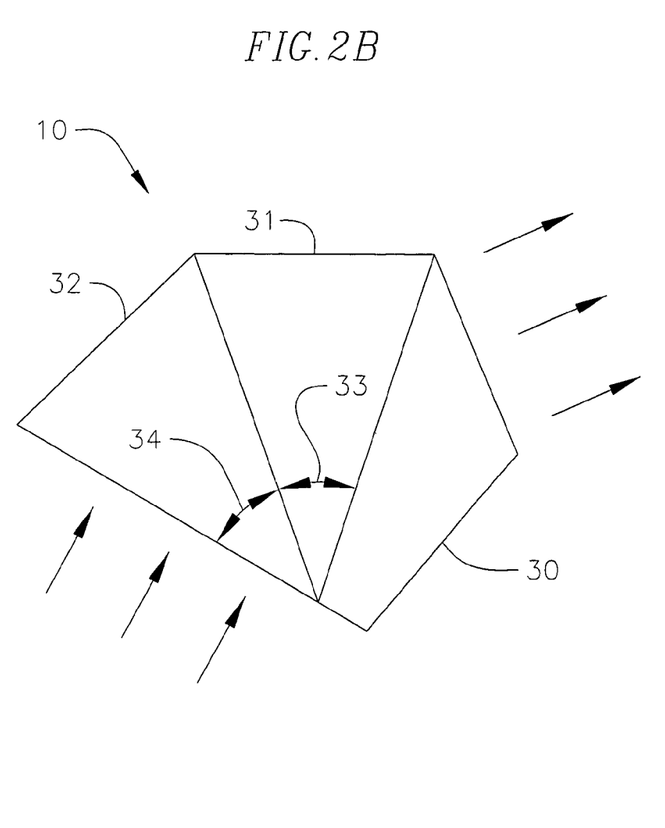
FIG. 2B is a right-side elevation view of the prism, in accordance with the present invention.
Figure 3A:
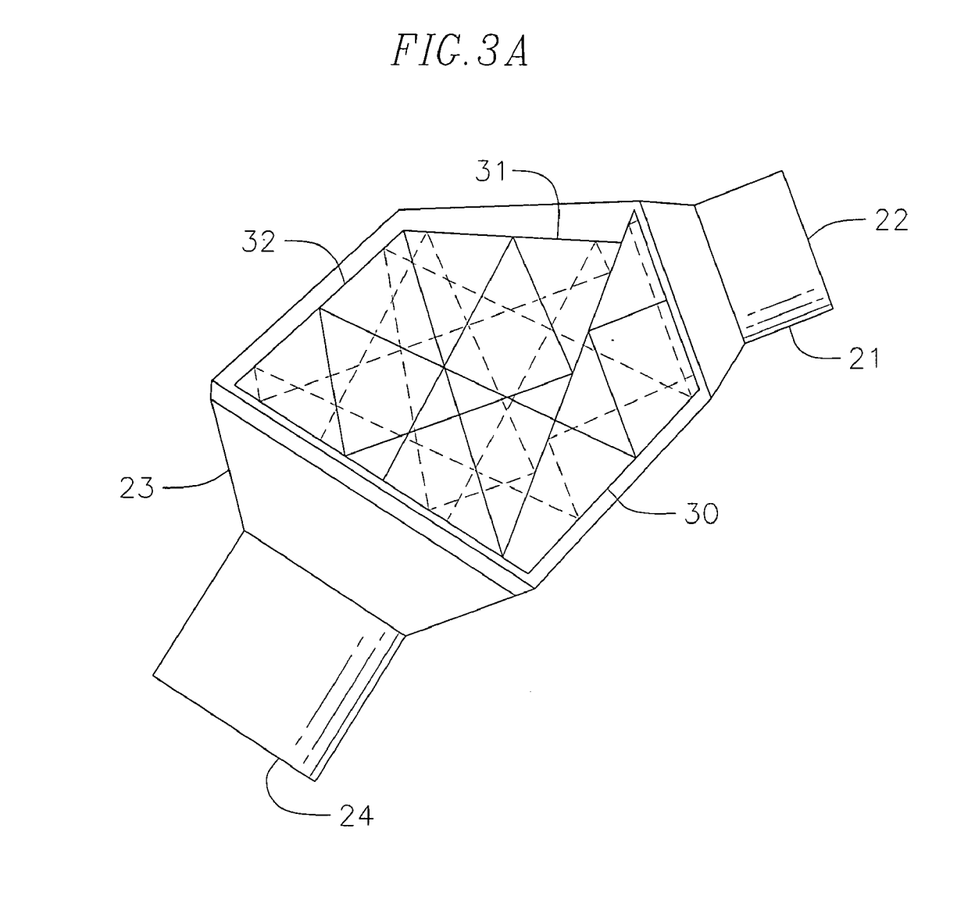
FIG. 3A is a right-side elevation view of the 2SP prism, with each prism having a roof, within a housing (the cover being removed), in accordance with the present invention.
Figure 3B:
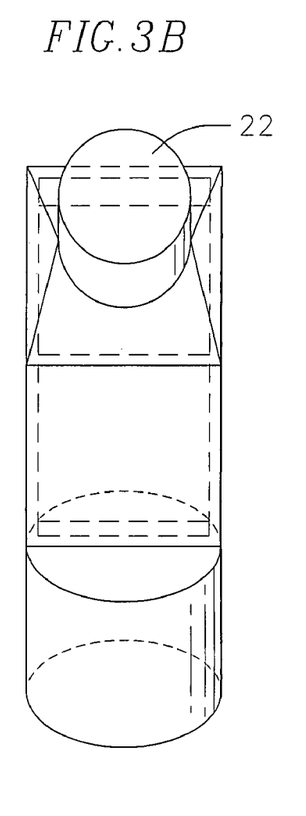
FIG. 3B is a rear elevation view of the housing with the prism shown in dotted lines, in accordance with the present invention.
Figures 4A, 4B:
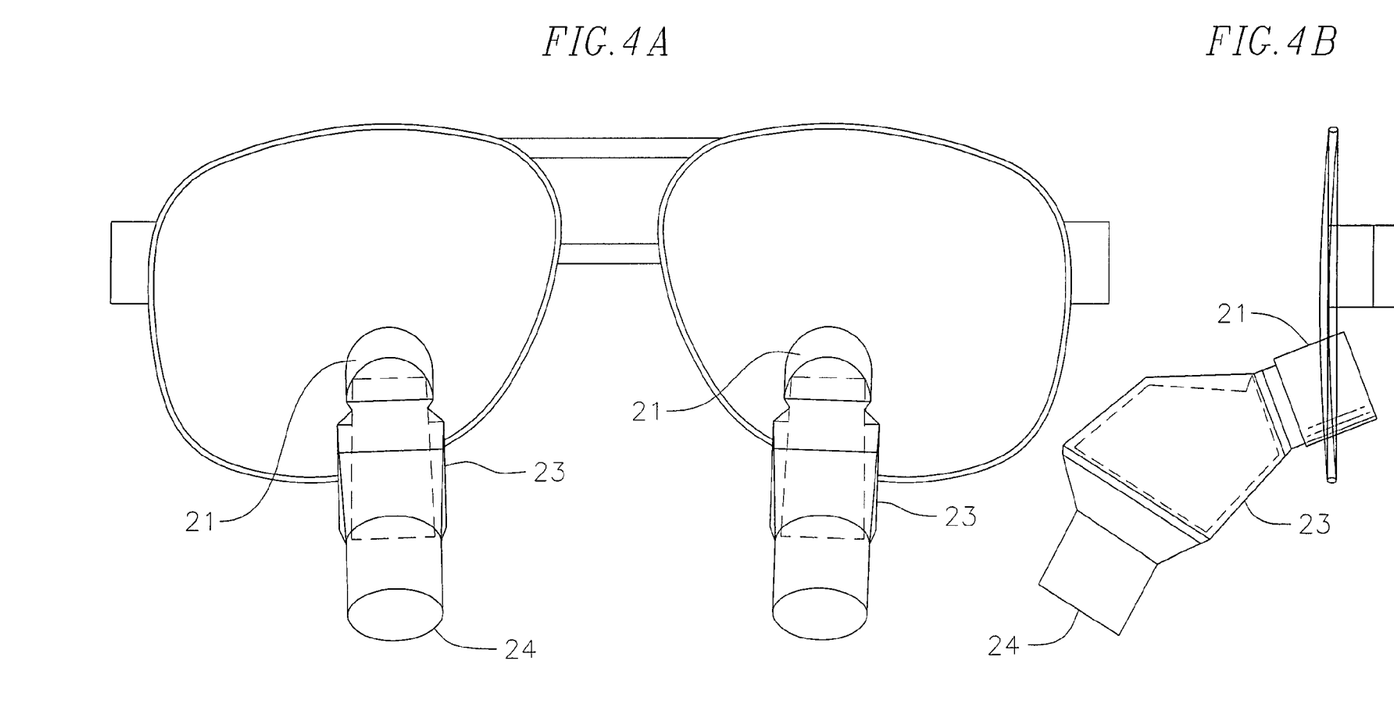
FIG. 4A is a front-end elevation view of the housings with prisms mounted on eyeglass frames, in accordance with the present invention.
FIG. 4B is a right-side (relative to the front view of FIG. 4A) elevation view of the device of FIG. 4A, in accordance with the present invention.
Figure 5:
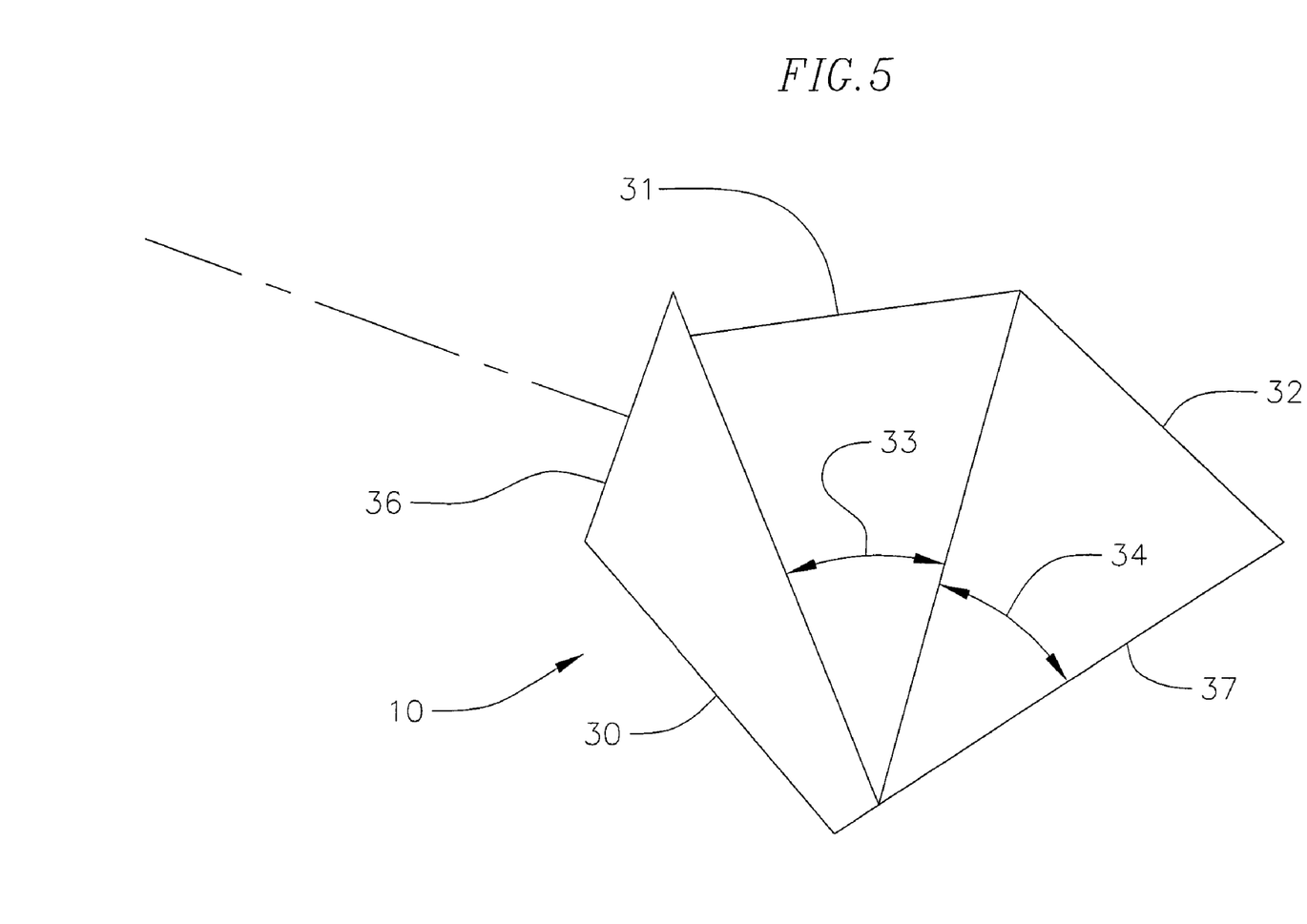
FIG. 5 is a left-side elevation view of the 2SP prism combination showing the approximate relative dimensions utilizing a 10-millimeter object aperture, in accordance with the present invention.

The 2SP combination prism 10 consists of two atypical Schmidt prisms 31 and 32 and one-half of a penta prism 30 (FIGS. 2 and 5). Schmidt prism 32 is positioned adjacent to the second Schmidt prism 31 and serves as the input prism for the 2SP combination. Referring to FIGS. 2A, 2B and 5 the three prism components are separated from each other by 0.05 millimeters and are secured in a lined position by plates or fixtures (not shown), as is common in the manufacture of Pechan prisms. The two Schmidt prisms 31 and 32 are unusual in that they do not have the standard 45° vertex angle. Instead, the vertex angles 33 and 34 of Schmidt prisms 31 and 32, respectively, are 41.25°.

The actual size of the 2SP prism in use is smaller than the views of FIGS. 2 and 5. For an object or input aperture 24 of 10 mm, each side opposite the vertex angle of each of the Schmidt prisms 31 and 32 has a length of 12 millimeters. Further, the entrance or input face 37 of Schmidt prism 32 is approximately 19 millimeters and the output or exit face 36 of the one-half penta prism 30 is approximately 10 millimeters. The overall height of the 2SP prism is 17 millimeters and the overall length is 24 millimeters. The maximum depth or width of each of the three prisms 30, 31 and 32 is 10 millimeters. Depending on the aperture size required, an even more compact 2SP prism is possible.

The SA combination prism 50 (FIGS. 10 and 11) consists of a typical Schmidt prism (45° apex angle) 51 and an Amici type prism or Amici Roof Prism 52. This prism is not a dispersive prism.

Figure 10A:
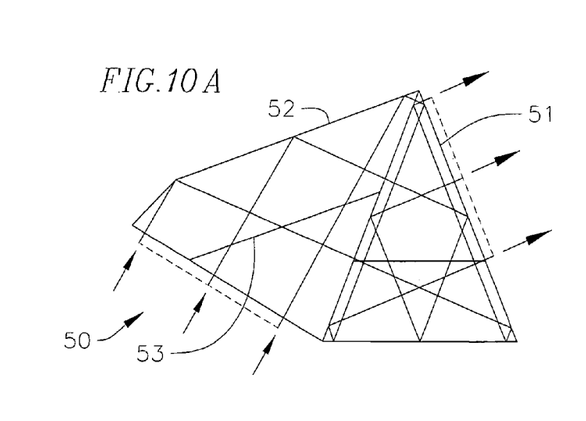
FIG. 10A is a right-side elevation view of an SA prism combination, with each prism having a roof, and the Amici type prism being the entry prism, in accordance with the present invention.
Figure 10B:
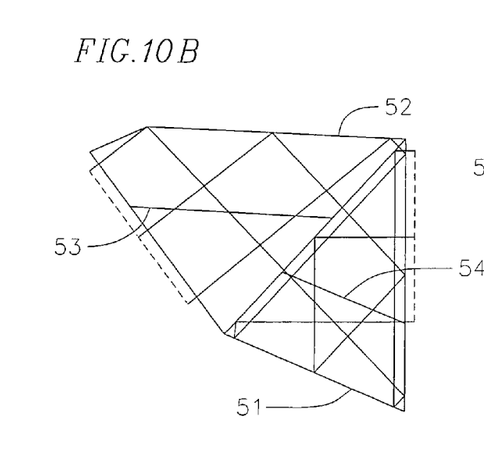
FIG. 10B is a right-side elevation view of the SA prism combination in a different orientation, in accordance with the present invention.
Figure 10C:
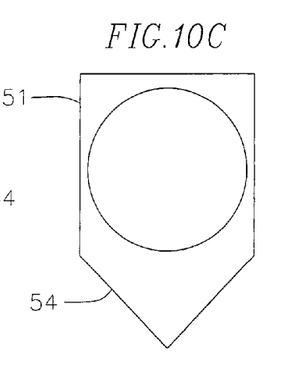
FIG. 10C is a rear-end view of the SA prism combination, with roof, in accordance with the present invention.
Figure 10D:
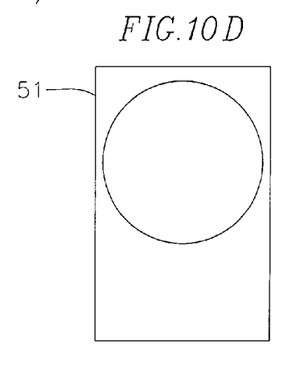
FIG. 10D is a rear-end view of the SA prism combination, without a roof, in accordance with the present invention.
Figure 11:
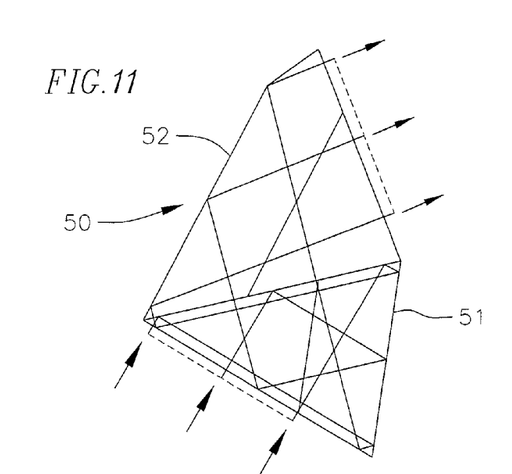
FIG. 11 is a right-side elevation view of the SA prism combination with the Schmidt prism being the entry prism, in accordance with the present invention.
Figure 12A:
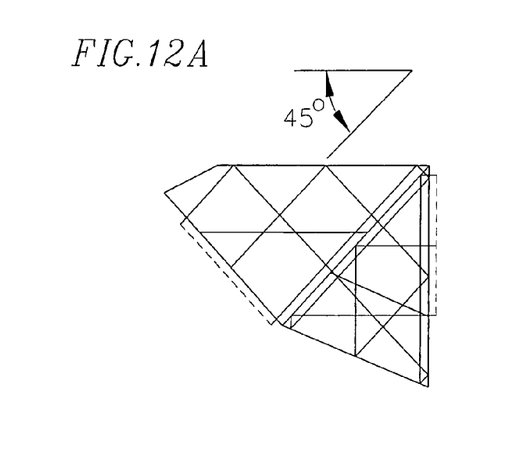
FIG. 12A-12H are right-side elevation views of the SA prism combination of FIG. 10. showing different angles for the Amici type sub-prism of the combination, in accordance with the present invention.
Figure 12B:
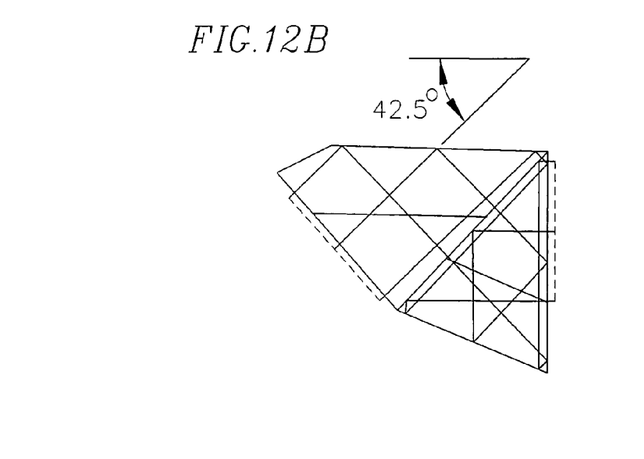
Figure 12C:
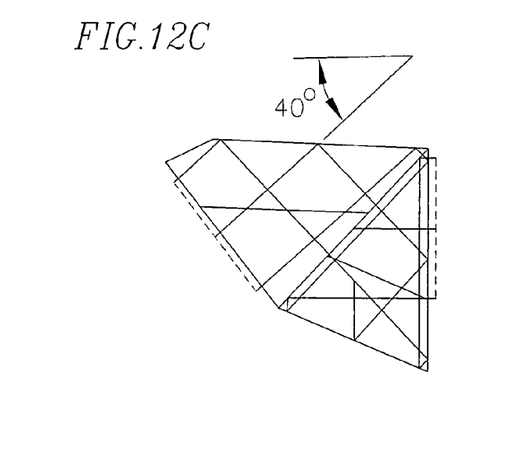
Figure 12D:
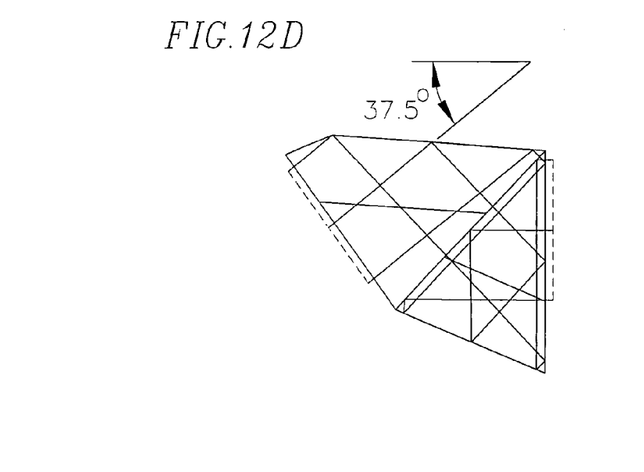
Figure 12E:
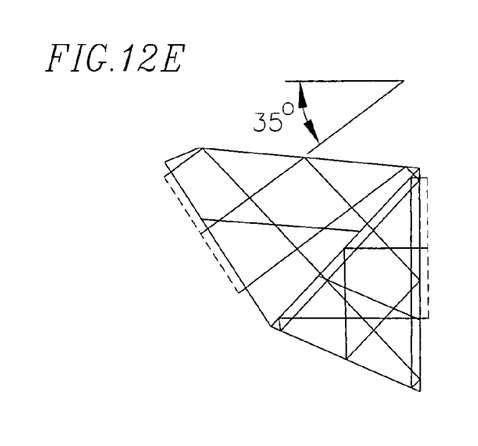
Figure 12F:
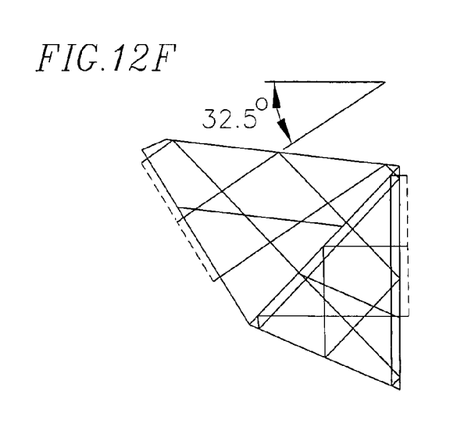
Figure 12G:
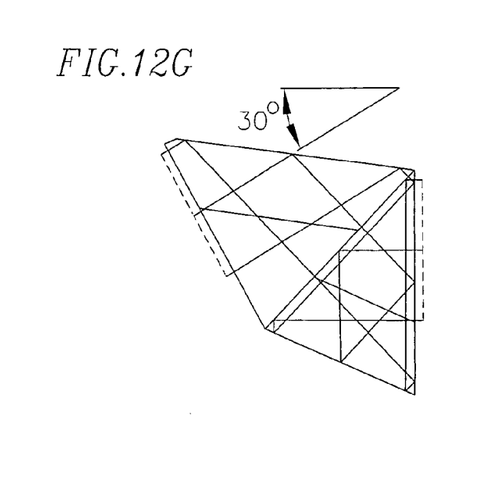
Figure 12H:
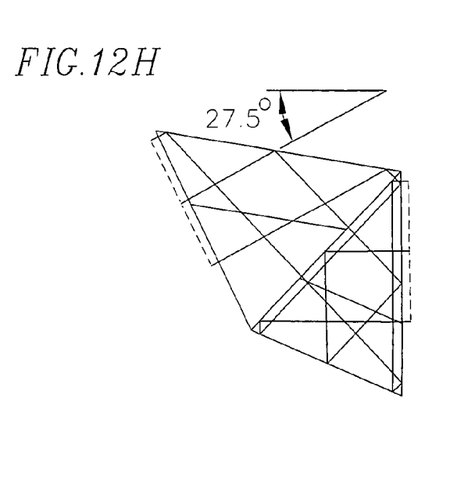

As shown in FIG. 10A the entry prism is the Amici type prism 52 with a roof 53. In this figure, the Schmidt prism 51 also has a roof 54. As shown in FIG. 11, the entry prism is the Schmidt prism 51. Either orientation provides the desired results of an eye tilt angle of 22.5° with a viewing angle of 60°.

The SA prism combination (FIG. 10) for a 10 mm aperture has an overall length and height of approximately 24 mm and 15 mm, respectively. The entrance face is nearly 14 mm and the exit face is approximately 16 mm. As with the 2SP prism combination, the maximum depth of the SA combination is 10 mm. With a smaller aperture, the dimensions of the SA prism combination are shorter resulting in a more compact prism.

It is to be noted that in the arrangement shown in FIG. 1 the prisms of this invention are utilized with both eyes to provide binocular vision for the dentist, surgeon or other user of the device. Other prisms which meet some of the requirements for the Prism for Ergonomic Position are shown in FIGS. 6-9. However, only the SA and 2SP designs fulfill all the features for an ideal Prism for Ergonomic Position.

In additional applications, with or without magnification, the housing 23 for each of the prisms, one for the left eye and one for the right eye, are coupled together and supported by a spectacle clip-on mechanism to be worn by the user. Alternatively, the housing 23 may be attached to spectacles in a manner shown in FIGS. 4A and 4B. Further, the housing 23, for the left eye and for the right eye, may be supported by a headband and held in the position shown in FIG. 1 for each eye of the user.

Although the description above contains specificity, this should not be construed as limiting the scope of the invention, but merely as providing illustrations of presently preferred embodiments of the invention. Although preferred embodiments have been described, the invention is not limited to the specific embodiments, but rather the scope of the invention is to be determined as claimed.

What is claimed is:

1. A viewing angle deflector comprising an eyepiece and a prism combination located proximal to the user's eye for deflecting the light rays from an object to the user's eye, the eye piece of the prism combination being below the user's straight-ahead viewing axis and tilted relative to horizontal, with the eyepiece tilt being less than 25 degrees relative to the horizontal wherein the prism combination comprises a first Schmidt prism as the prism nearest an object, a one-half pentaprism nearest the eyepiece and a second Schmidt prism between the first Schmidt prism and the one-half pentaprism.

2. A viewing angle deflector comprising an eyepiece and a prism combination located proximal to the user's eye for deflecting the light rays from an object to the user's eye, the eye piece of the prism combination being below the user's straight-ahead viewing axis and tilted relative to horizontal, with the eyepiece tilt being less than 25 degrees relative to the horizontal wherein the prism combination comprises a one-half pentaprism as the prism nearest an object, a first Schmidt prism nearest the eyepiece and a second Schmidt prism between the first Schmidt prism and one-half pentaprism.

3. A viewing angle deflector comprising an eyepiece and a prism combination located proximal to the user's eye for deflecting the light rays from an object to the user's eye, the eye piece of the prism combination being below the user's straight-ahead viewing axis and tilted relative to horizontal, with the eyepiece tilt being less than 25 degrees relative to the horizontal wherein the prism combination comprises a Schmidt prism and an Amici Roof prism with the Amici Roof prism being the input prism and the Schmidt prism being nearer the eyepiece.

4. A viewing angle deflector comprising an eyepiece and a prism combination located proximal to the user's eye for deflecting the light rays from an object to the user's eye, the eye piece of the prism combination being below the user's straight-ahead viewing axis and tilted relative to horizontal, with the eyepiece tilt being less than 25 degrees relative to the horizontal wherein the prism combination comprises a Schmidt prism and an Amici Roof prism with the Amici Roof prism being closer to the eyepiece and the Schmidt prism being the input prism.

* * * * *